W. V. VAN ETTEN.
SEED SEPARATOR AND GRADER.
APPLICATION FILED DEC. 26, 1919.
1,385,957.
Patented July 26, 1921.
2 SHEETS—SHEET 2.
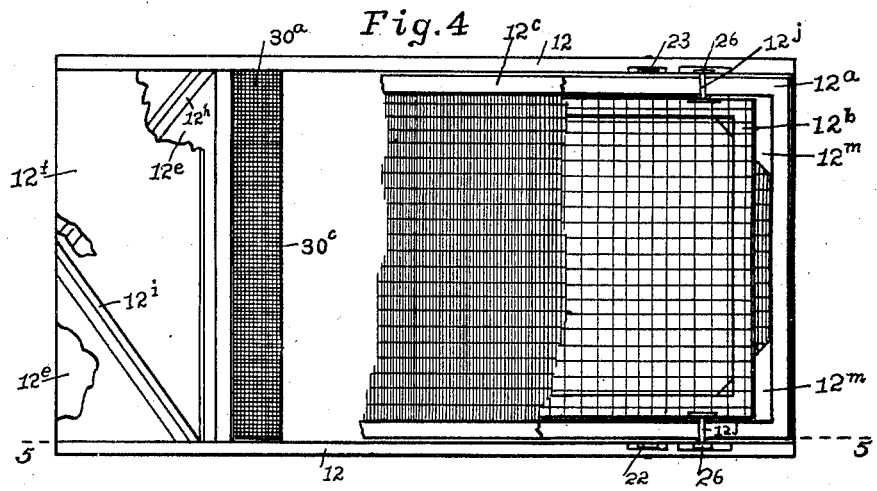
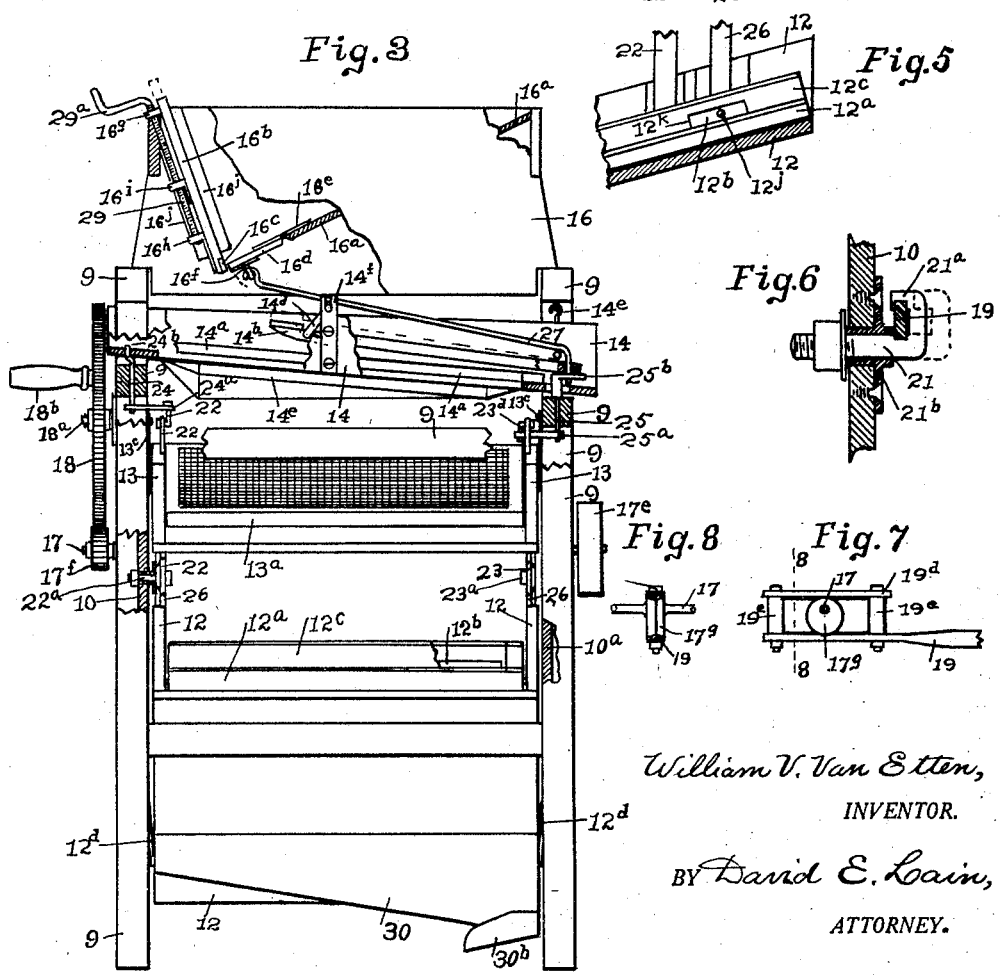
William V. Van Etten,
INVENTOR.
BY David E. Lain,
ATTORNEY.

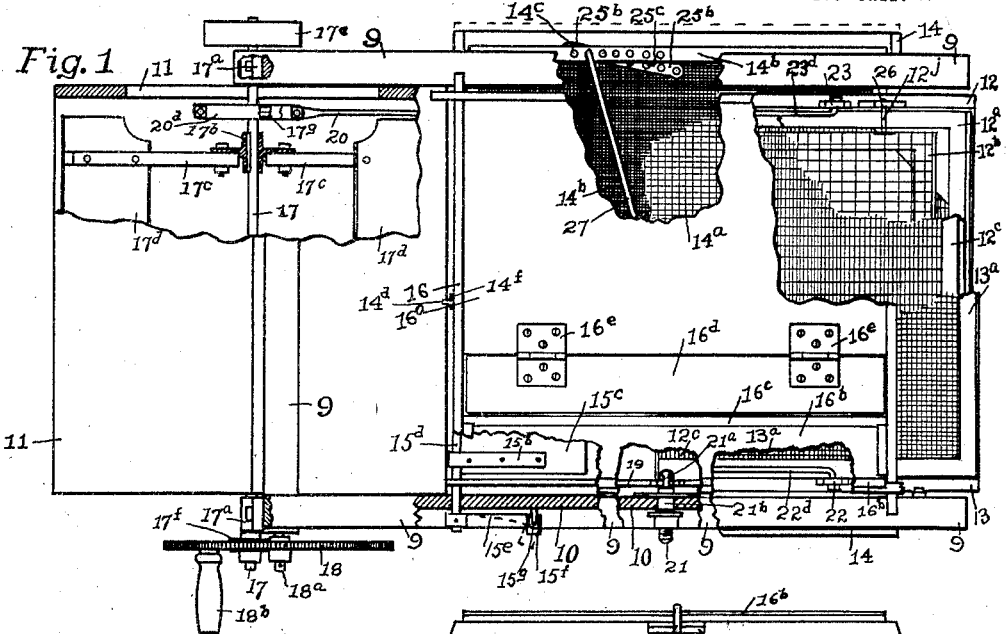

UNITED STATES PATENT OFFICE.

WILLIAM V. VAN ETTEN, OF BELLINGHAM, WASHINGTON.

SEED SEPARATOR AND GRADER.

1,385,957.  Specification of Letters Patent.  Patented July 26, 1921.

Application filed December 26, 1919. Serial No. 347,388.

*To all whom it may concern:*

Be it known that I, WILLIAM V. VAN ETTEN, a citizen of the United States, residing at Bellingham, in the county of Whatcom and State of Washington, have invented a new and useful Seed Separator and Grader, of which the following is a specification.

My invention relates to improvements in seed separators and graders, and the objects of my improvements are to produce a seed separator that will make a definite, complete and rapid separation of the several useful seeds and grains on a basis of their size and shape, divide the separated grains into several grades on a basis of their size, completely remove all chaff and dirt without loss of seed, provide a structure in which the principal operative parts are within an inclosure, and to provide other novel and useful features as will hereinafter appear.

I accomplish these objects by the use of the mechanism illustrated in the accompanying two sheets of drawings in which Figure 1 is a plan view of my separator, Fig. 2 is an elevational view of the right-hand side of said separator, Fig. 3 is a rear elevation of Fig. 1, Fig. 4 is a plan view of the lower riddle, and its sieves, Fig. 5 is a side elevation of a part of Fig. 4 in section on the line 5—5, Fig. 6 is a sectional view of a part of Fig. 2 on the line 6—6, drawn on a larger scale, Fig. 7 is a separated view of the eccentric drive, and Fig. 8 is a sectional view of Fig. 7 on the line 8—8.

Similar characters refer to similar parts throughout.

Certain parts are broken away in order to show other parts hidden thereby.

Additional positions of operative parts are shown in dotted lines.

More particularly: The inclosure in and on which the operative mechanism is mounted comprises frame members 9, front and rear sides respectively 10 and $10^a$, and fan housing 11.

12 is the lower riddle, it is longitudinal of the machine and inclines upward from the front of the same. $12^a$ is the bottom sieve of riddle 12, while it is easily removable it moves with said riddle. $12^b$ is a brush screen of coarser mesh than $12^a$ separately movable on sieve $12^a$ and under sieve $12^c$, it comprises a frame with coarse wire net on both sides. $12^c$ is a sieve in riddle 12 on top of sieve $12^a$ and covering brush screen $12^b$. Sieve $12^c$ is of smaller mesh than brush screen $12^b$ has no movements except with riddle 12. $12^d$, $12^d$ are two links pivoted to riddle 12 near its lower end and to frame members 9. On said links the lower end of riddle 12 is suspended. $12^e$ and $12^f$ are respectively lower and upper spouts in the lower or front end of riddle 12. They are separated by partition $12^g$, and spout $12^e$ has the diagonal baffle $12^h$ which causes grain passing through it to be delivered to the right, while spout $12^f$ has the diagonal baffle $12^i$ which causes grain passing through it to be delivered to the left, see Fig. 4. Grain passing over sieve $12^c$ is delivered by spout $12^f$, while grain passing over sieve $12^a$ is delivered by spout $12^e$. $12^j$, $12^j$ are two pins in the side rails of brush screen $12^b$. They project outward and are engageable with slots $26^a$ in the lower ends of arms 26. $12^k$, $12^k$ are notches in the side rails of sieve $12^c$ to permit the movement of pins $12^j$ without moving said sieve. $12^m$, $12^m$ are chaffing plates in the upper corners of sieve $12^a$. There are two similar plates on the lower end of said sieve, not shown in Fig. 4. These plates afford slideways for brush screen $12^b$.

13 is the middle riddle. It is longitudinal of the machine, and it inclines downward from its front end. $13^a$ is the sieve in riddle 13 in which it is normally fastened. $13^b$ is an apron chute fastened on the bottom of riddle 13 and delivers grain passing through sieve $12^a$ to the upper end of sieve $12^c$. $13^c$, $13^c$, $13^c$, $13^c$ are four links pivoted to riddle 13 and to frame members 9 and sides 10 and $10^a$ to suspend said riddle.

14 is the upper riddle which is disposed transversely of the machine, and inclines downward from the right-hand side of said machine. $14^a$ is a sieve normally fastened in riddle 14. $14^b$ is a brush screen suspended over sieve $14^a$. $14^c$, $14^c$ are holes in the lower rail of the frame of brush screen $14^b$. $14^d$, $14^d$ are two Z links the lower ends of which are engaged with the forward and higher end of brush screen $14^b$ and the upper ends of which engage in notches in the upper ends of standards $14^f$, $14^f$ fastened to the sides of riddle 14. $14^e$ is an apron chute fastened to the bottom of riddle 14 and delivers grain passing through sieve $14^a$ to the upper end of sieve $13^a$.

15 is the bottom of the outlet of fan housing 11 and fills the whole width of the machine between sides 10 and $10^a$. $15^a$ is the top of said outlet. $15^c$ is a damper located to be an extension of $15^a$. Said damper is hung on damper shaft $15^d$ to which it is fastened by U straps, one of which is shown at $15^b$ in Fig. 1. Said damper shaft finds bearings in holes through sides 10 and $10^a$ and protrudes through side 10 where damper crank $15^e$ is fastened to it. $15^f$ is a hollow handle on crank $15^e$. $15^g$, $15^g$ are pins in side 10 in an arc about shaft $15^d$. Crank $15^e$ is flexible and handle $15^g$ can be engaged with either of said pins to hold damper $15^c$ in a position to make as near a closure of said fan-housing outlet as the work being done by the machine may require.

16 is the hopper and sits on top of the machine exactly over riddle 14. $16^a$ is the bottom of said hopper and inclines downward from the rear side of the machine. $16^b$ is the hopper gate and is movable diagonally up and down in guides $16^j$. $16^c$ is a rubber strip along the bottom of said gate. $16^d$ is the hopper door and is hingeably connected to the lower edge of hopper floor $16^a$ by hinges $16^e$, $16^e$. $16^f$ is a staple on the bottom of door $16^d$ for engagement with a hook on the upper end of link 27. $16^g$ is a plate having a tapped hole fastened to the top edge of the right-hand side of hopper 16. Gate screw 29 is engaged in plate $16^g$. $16^h$ is a bracket fastened to said gate near its bottom having a hole with which the lower end of screw 29 is engaged for rotation but can not be moved lengthwise therein. $16^i$ is a guide bracket fastened to said gate having a hole through which said screw may freely pass.

17 is a shaft mounted in bearings $17^a$, $17^a$ fastened to the front frame of the machine. On said shaft are fastened fan spiders $17^b$, $17^b$, and to them are fastened fan arms $17^c$, and in turn to said arms are fastened fan paddles $17^d$. Fan arms $17^c$ are preferably bent as shown in Fig. 2 to cause the paddle of one arm to stand vertically in front of the fan housing outlet when the next paddle in advance is passing the cutoff at $15^a$, Fig. 2. $17^e$ is a power pulley fastened to the rear protruding end of shaft 17. $17^f$ is a spur gear fastened to the front protruding end of shaft 17. On shaft 17 inside of bearings $17^a$ are fastened two eccentrics $17^g$, only one of which is shown in Fig. 2.

18 is a driver gear mounted for revolution on stud $18^a$ which is fastened to frame 9 in a position to cause said gear to engage with spur gear $17^f$. $18^b$ is a handle fastened to gear 18.

19 is a power lever the front end of which is shown at $19^a$ in Fig. 2. $19^b$, $19^b$ are notches in the upper edge of said lever near its rear end. $19^c$, $19^c$ are notches in the bottom edge of said lever corresponding with notches $19^b$. $19^d$ is a short slideway bar fastened to $19^a$ and parallel therewith by spacing bolts $19^e$, $19^e$. Between $19^a$ and $19^d$ revolves eccentric $17^g$, the periphery of which is grooved to fit the V form upper and lower edges of $19^a$ and $19^d$ respectively. $19^f$ is the rounded rear end of said lever.

20 is a power lever similar in all respects to lever 19 above described and mounted on the rear side of the machine, and its front end with slideway bar $20^d$ forms parallel ways in which the other eccentric operates.

21 is a fulcrum bolt, having a hook end $21^a$, and is mounted in flanged bearing $21^b$ in side 10. A separated enlarged view of this bolt is shown in Fig. 6. One of the bottom notches $19^c$ on lever 19 is engaged on top of said bolt while hook $21^a$ is engaged in the corresponding notch $19^b$. Said bolt is held in operative position by a nut and rocks in bearing $21^b$ as lever 19 is operated by eccentric $17^g$. To change the bearing notch engaged with bolt 21 said nut is backed off and said bolt is put in its dotted position shown in Fig. 6 when said lever can be shifted as desired and remounted on said bolt. Another similar fulcrum bolt is provided for lever 20 on which it is mounted in side $10^a$. This bolt is not illustrated.

22 is a T crank mounted on bolt $22^a$ which is placed in a flanged bushing in side 10. $22^b$ is the stem of crank 22 and is bifurcated to receive the rounded rear end $19^f$ of lever 19. The lower end of crank 22 is pivoted to the right-hand side of riddle 12, near its rear end, by pin $22^c$. In a hole in the upper end of crank 22 is connected link $22^d$ the other end of which is connected to crank $24^a$. Below the upper end of crank 22 is a hole in which is pin $22^e$ to connect said crank pivotally with the rear end of the front side of riddle 13.

23 is a T crank in every way similar to crank 22 above described, its bifurcated stem is engaged with the rounded rear end of lever 20 and it is pivoted to side $10^a$ by bolt $23^a$. The lower and upper ends of crank 23 suspend the left-hand rear ends of riddles 12 and 13 respectively in the same manner as the right-hand rear ends of these riddles are suspended by crank 22 above described. Link $23^d$ connects the upper end of crank 23 with crank $25^a$.

24 is a vertical crank shaft mounted in a hole in a front horizontal frame member, on its lower end is fastened crank $24^a$ and a crank on its upper end is engaged with and supports the upper end of transverse riddle 14.

25 is a vertical crank shaft mounted in a hole in a rear side horizontal frame member to the lower end of which is fastened crank $25^a$ and to the upper end of which is fastened crank $25^b$. In crank $25^b$ is a row of holes $25^c$.

26, 26 are two arms one of which is fastened to each side of riddle 13 near its rear end, and they hang downward from said riddle. Each of said arms has an open slot in its lower end with which one of pins 12ʲ engages when brush screen 12ᵇ is in operative position.

27 is a link one end of which is formed into a hook to engage with staple 16ᶠ in hopper door 16ᵈ, and the other end of which is bent down at a right angle and passes through one of holes 14ᵉ in the lower rail of brush screen 14ᵇ and also through one of holes 25ᶜ in crank 25ᵇ.

29 is a screw having hand crank 29ᵃ and is used to operate hopper gate 16ᵇ as previously described.

30 is a screen chute fastened transversely beneath the lower end of riddle 12 and inclined downward from its right-hand end. Its bottom is covered with screen 30ᵃ. 30ᵇ is a reversed chute fastened beneath the lower end of screen 30ᵃ to turn the seed passing through the left-hand end of said screen back toward the right. 30ᶜ is an opening through the entire width of the bottom of riddle 12 to provide an inlet into chute 30.

In operation: Power may be applied to pulley 17ᵉ or by hand to handle 18ᵇ to revolve shaft 17. The revolution of said shaft operates fan 17ᵈ and causes a current of air to pass out of the fan-housing outlet from where it moves over the upper end of the sieves in riddle 12, through the seed falling from riddle 13 to riddle 12 and thence out of the machine. The volume and pressure of this air current are controlled by the rate of fan revolution and by the set of damper 15ᶜ.

The operation of shaft 17 also causes eccentrics 17ᵍ, 17ᵍ to produce oscillations in the rear ends of levers 19 and 20. Thus cranks 22 and 23 are caused to rock on bolts 22ᵃ and 23ᵃ respectively which produces relatively opposite vibrations in riddles 12 and 13, opposite vibrations in sieves 12ᵃ or 12ᶜ as compared to vibrating brush screen 12ᵇ, and relatively opposite vibrations in sieve 14ᵃ and brush screen 14ᵇ. Hopper door 16ᵈ is also caused to vibrate by the same power in unison with the other operative parts. The amplitude of the vibrations of these several moving parts is varied by moving levers 19 and 20 to bring another notch in engagement with bolts 21. The amplitude of the movements of brush screen 14ᵇ and hopper door 16ᵈ is also varied by engaging the lower end of link 27 with another hole in screen frame 14ᵇ and crank 14ᶜ. The amount of seed permitted to flow from hopper 16 is further varied by the set of gate 16ᵇ.

The operation of brush screen 14ᵇ, the meshes in which are too small to allow seed to pass therethrough, alternately compresses and releases, rolls, and advances the mixture of chaff, broken straw, detritus and seed, allowing said seed opportunity to settle through the mixture and reach and pass through sieve 14ᵃ before said mass passes out at the rear side of the machine. In the ordinary separator the accomplishment of this object so completely when there is a considerable bulk of detritus has proved difficult.

Brush screen 12ᵇ checks the free flow of seeds over screen 12ᵃ, aids in keeping the same clean and is effective in separating oats from shorter grains, and in making a close grading of seeds according to the size of the grains.

The use of wide hopper door 16ᵈ in conjunction with hopper gate 16ᵇ gives a better control of the entry of the mixture of seeds and detritus into the machine than has hitherto been possible.

Rubber strip 16ᵉ on the lower edge of gate 16ᵈ is required to prevent bruising and cracking seed between the hopper door and gate when they are set to bring said door close to said gate during operation of the former.

The inclination of fan paddles 17ᵈ to fan arms 17ᶜ causes a more effective drive of air into the fan outlet than is possible with the usual radial position of said paddles.

By placing power levers 19 and 20 within the inclosure, rather than on the outside as usual, a greater protection from injury is had and more convenient connections with interior parts are possible than the usual arrangement permits of.

My arrangement of old devices and new in this machine makes it well adapted to accomplish the objects intended.

Having thus fully disclosed my invention, what I claim as new and desire to secure by Letters Patent is, 1. In combination, a seed receptacle, means to draw seed from said receptacle in a wide stream, means to control the volume of said flowing seed, a shakable seed sieve below said receptacle, means to vibrate said sieve rapidly in short arcs, means to change the amplitude of said arcs of vibration, a brush screen mounted above said sieve, means to cause the front end of said brush screen to vibrate rapidly in an arc of short length and the rear end of the same to vibrate in a plane, said movements timed with those of said sieve but in an opposite direction, and means to change the amplitude of the vibrations of said brush screen.

2. In combination, the shaft of a seed separator blower; a pair of eccentric disks fastened on said shaft; a pair of fulcrumed levers each having a slideway frame for one of said eccentrics on one end and a knob on the other end, said slideway frame mounted on said eccentric and said knob engaged with the bifurcated stem of a T crank; a fulcrum for each of said levers; means to mount each of said levers on its fulcrum; a pair of T cranks pivoted for oscillation, each having a bifurcated stem engaged with one of the knob ends of said levers; two registering riddles, one above the other and one end of the lower riddle suspended from the lower ends of said T cranks and one end of the upper of said riddles suspended from the upper ends of said T cranks; a pair of arms fastened to the sides of said upper riddle extending downward within said lower riddle; a sieve in said lower riddle movable therewith; and a brush screen in said lower riddle, slidable on top of said sieve, engaged with the lower ends of said arms.

3. In combination, the shaft of a seed separator blower; a pair of eccentric disks fastened to said shaft; a pair of fulcrumed levers each having a slideway frame for one of said eccentrics on one end and a knob on the other end, said slideway frame mounted on said eccentric and said knob engaged with the bifurcated stem of a T crank; a fulcrum for each of said levers; means to mount said levers on said fulcrums at any one of several points on the same; a pair of T cranks each pivoted for oscillation and each having a bifurcated stem engaged with one of the knob ends of said levers; two registering riddles, one above the other and one end of the lower riddle suspended from the lower ends of said T cranks and one end of the upper riddle suspended from the upper ends of said T cranks; a pair of arms fastened to the sides of said upper riddle and extending down into said lower riddle; a sieve in said lower riddle movable therewith; and a brush screen in said lower riddle, slidable on top of said sieve, and engaged with the lower ends of said arms.

4. In combination, the shaft of a seed-separator blower, power connections between said shaft and a pair of oscillatable cranks, a pair of vertical oscillatable cranks pivoted at their middle, a lower longitudinal riddle, a middle longitudinal riddle, an upper transverse riddle, suspension means for one end of each of said riddles, pivotal connections between the lower ends of said pair of cranks and the other end of said lower riddle, pivotal connections between the upper ends of said pair of cranks and the other end of said middle riddle, and power connections between the upper end of one of said cranks and the other end of said upper riddle.

5. In combination, the shaft of a seed separator blower, power connections between said shaft and a pair of T cranks pivoted at their middle with their top members vertical, a pair of T cranks, oscillatable about a central pivot, a lower longitudinal riddle the upper end of which is pivotally connected to the lower ends of said T cranks, a middle longitudinal riddle the lower end of which is connected to the upper ends of said T cranks, an upper transverse riddle the upper end of which is connected through a crank and connecting rod to the upper end of one of said T cranks, an independently shakable brush screen in said upper riddle, connections between said upper-riddle brush screen and the upper end of the other T crank, through a crank and connecting rod, an independently shakable brush screen in said lower riddle, and power connections between said lower-riddle brush screen and said middle riddle.

WILLIAM V. VAN ETTEN.